Aug. 4, 1936.  F. HAMM  2,049,802

HEADLIGHT FOR VEHICLES

Filed Dec. 16, 1935

INVENTOR
Fred Hamm
BY
ATTORNEY

Patented Aug. 4, 1936

2,049,802

UNITED STATES PATENT OFFICE 2,049,802

HEADLIGHT FOR VEHICLES

Fred Hamm, Milwaukee, Wis.

Application December 16, 1935, Serial No. 54,627

9 Claims. (Cl. 240—62.3)

This invention relates to new and useful improvements in headlights for vehicles.

The invention has for an object the provision of a mechanism by which the headlights are automatically moved during the steering of the vehicle to facilitate the illumination of the road upon which the vehicle is travelling.

Another object of the invention is the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
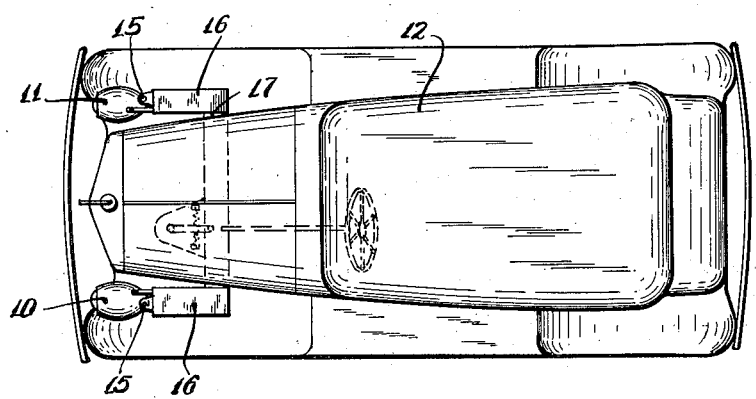
Fig. 1 is a plan view of a motor vehicle equipped with headlights according to this invention.
Figure 2:
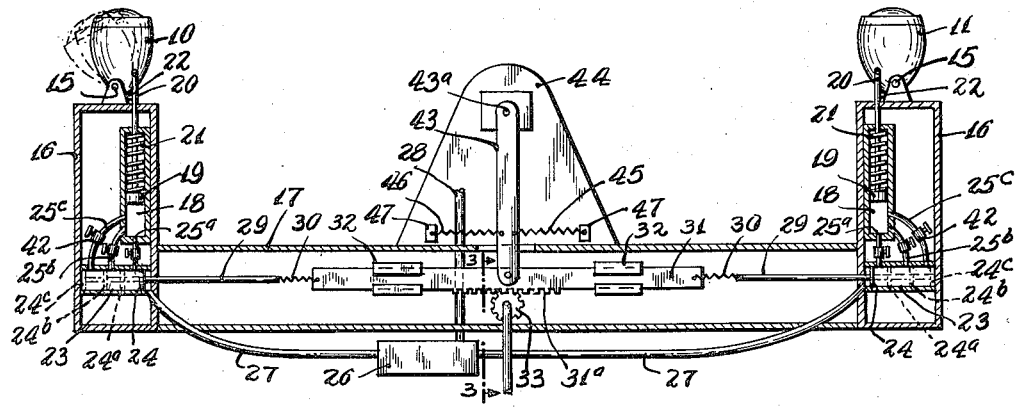
Fig. 2 is a horizontal sectional view of the mechanism for operating the headlights.
Figure 3:
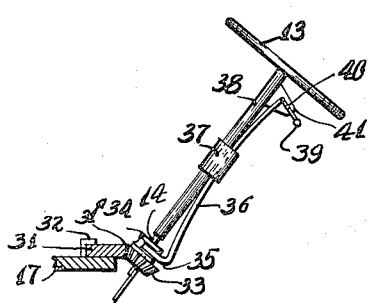
Fig. 3 is a sectional view as though taken on the line 3—3 of Fig. 2, but showing the wheel and steering column of the vehicle in greater detail.

The light projecting device for vehicles, according to this invention, includes a pair of headlights 10 and 11 on the sides of the motor vehicle 12 having a conventional steering wheel 13 connected with a steering column 14. The other details of the steering mechanism of the vehicle, or the vehicle itself, are conventional and for this reason will not be described in this specification.

The headlights 10 and 11 are pivotally mounted by pintles 15 upon casings 16 which are connected with each other by a transverse casing 17. The arrangement is such that the headlights 10 and 11 may swing to the right or left, in the horizontal.

A cylinder 18 with a piston 19 which is connected by linkage 20 with each of said headlights, is adapted to pivot the headlights when properly operated with air. There are springs 21 in the cylinders 18 which act between the pistons 19 and the cylinders for normally urging the headlights to their normal position directed substantially forwards. Stop lugs 22 are mounted upon some stationary part adjacent the head lamps and are adapted to limit inward motion of the head lamps to the said normal positions. Thus, the headlamp 10 may only pivot towards the left, while the right headlamp 11 may only pivot towards the right.

A pilot cylinder 23 is provided for each of the cylinders 18. A piston 24 is in each pilot cylinder 23. Several restricted pipes 25ª, 25ᵇ, and 25ᶜ connect different parts of the pilot cylinders 23 with the cylinders 18. Said pistons 24 in the pilot cylinders control the passage of air through the several restricted pipes. An air tank 26 for a supply of air has pipes 27, extended to the pilot cylinders 23 and the pipes 27 enter the cylinders at the inner ends at which ends they are normally closed by the pistons 24 so that the air is restrained from passing through the restrained pipe 25ª, 25ᵇ, and 25ᶜ. The tank 26 is supplied with air by a pipe 28 which connects with a compressor (not shown) connected with the engine of the vehicle (also not shown).

The pistons 24 are provided with stems 29 which are connected by resilient elements 30, such as helical springs, with a bar 31 which is slidably supported by tracks 32. Means connected with the steering column 14 of the vehicle are adapted to move the bar 31 in one direction or the other direction, depending on the direction of steering.

There is a pinion 33 fixed upon the steering column 14 which normally meshes with rack teeth 31ª upon the slidable bar 31. This pinion 33 has a grooved collar 34 which is engaged by a fork 35 upon the end of the control rod 36 which passes through a friction device 37 mounted upon the casing 38 of the steering column 14. The upper end of the rod 36 connects with one end of a lever 39 which is pivotally mounted at 40 on a lug 41 mounted on the casing 38. The lever 39 may be moved to slide the pinion 33 out of contact with the rack teeth 31ª. The pinion 33 is spliced or keyed on the column 14.

Each of the restrained pipes 25ª, 25ᵇ, and 25ᶜ are restricted by an adjustable needle valve 42 interposed therein. A bar 43 at right angles to the bar 31 is pivotally connected therewith and is pivotally connected at the other end 43ª upon a support 44 attached on the casing 17. Balanced springs 45 and 46 are connected with opposite sides of the bar 43 and act between stationary lugs 47 projecting from the support 44 so that the bar 43 is normally urged into a neutral position, which position corresponds with the normal position of the slidable bar 31.

The operation of the device is as follows:—
When the steering wheel 13 is turned towards the left the bar 31 will be moved towards the left and the stem 29 will be moved inwards. The spring 30 on the right hand end of the bar 31 will merely stretch, but will not move the stem to which it is attached. Upon a comparatively slight turn towards the left, the piston 24 at the left will move slightly to the position indicated by the dot and dash lines 24ª to expose the restricted pipe 25ª. The compressed air from the line 27 will then partially discharge into the cylinder 18 and the piston 19 will move forwards compressing the spring 21 to a certain extent, and immediately pivoting the headlamp 10 a certain angular distance towards the left. If the steering wheel 13 is turned further towards the left the piston 24 will soon reach the position indicated by the dot and dash lines 24ᵇ, and now both of the restricted pipes 25ª and 25ᵇ will be exposed to the air from the line 27. This will insure further pivoting the lamp 10 another step towards the left. If the wheel 13 is turned still further towards the left the piston 24 will reach the position 24ᵇ and now all three of the restricted pipes 25ª, 25ᵇ, and 25ᶜ will be exposed. The lamp 10 is then moved still further towards the left.

Similarly, if the steering wheel 13 is moved towards the right, the right lamp 11 will be moved in several steps towards the right depending merely upon the extent to which the steering wheel 13 is turned.

The device may be rendered inoperative at a moment's notice so that the springs 21 will return the lamps to the normal positions, by moving the lever 39. This will disconnect the pinion 33 from the rack 31ª. The springs 45 and 46 will then bring the lamps back to the said normal positions. The gear 33 may be re-engaged with the rack 31 when the steering wheel 13 is in a position in which the vehicle is travelling straight forwards.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In combination with a motor vehicle, a pair of headlights on the sides of said motor vehicle and pivotally supported to swing right or left in the horizontal, a cylinder with a piston connected by linkage with each of said headlights to pivot said headlights, springs in said cylinders for normally urging said headlights to be directed straight forwards, a pilot cylinder for each of said cylinders, pistons in said pilot cylinders, several restricted pipe lines from different parts of said pilot cylinders connecting with said cylinders, an air supply to the pilot cylinders, said pistons with the pilot cylinders controlling the passage of air to said restricted pipe lines, a slidable bar resiliently connected with each of the pistons in the pilot cylinders, and means connected with the steering column of said vehicle for moving said bar in one direction or the other depending upon the direction of steering.

2. In combination with a motor vehicle, a pair of headlights on the sides of said motor vehicle and pivotally supported to swing right or left in the horizontal, a cylinder with a piston connected by linkage with each of said headlights to pivot said headlights, springs in said cylinders for normally urging said headlights to be directed straight forwards, a pilot cylinder for each of said cylinders, pistons in said pilot cylinders, several restricted pipe lines from different parts of said pilot cylinders connecting with said cylinders, an air supply to the pilot cylinders, said pistons within the pilot cylinders controlling the passage of air to said restricted pipe lines, a slidable bar resiliently connected with each of the pistons in the pilot cylinders, and means connected with the steering column of said vehicle for moving said bar in one direction or the other depending upon the direction of steering, the lamp at the right side of the vehicle being limited by a stop to pivot towards the right only, and the lamp at the left side of the vehicle being limited by a stop to pivot towards the left only.

3. In combination with a motor vehicle, a pair of headlights on the sides of said motor vehicle and pivotally supported to swing right or left in the horizontal, a cylinder with a piston connected by linkage with each of said headlights to pivot said headlights, springs in said cylinders for normally urging said headlights to be directed straight forwards, a pilot cylinder for each of said cylinders, pistons in said pilot cylinders, several restricted pipe lines from different parts of said pilot cylinders connecting with said cylinders, an air supply to the pilot cylinders, said pistons within the pilot cylinders controlling the passage of air to said restricted pipe lines, a slidable bar resiliently connected with each of the pistons in the pilot cylinders, and means connected with the steering column of said vehicle for moving said bar in one direction or the other depending upon the direction of steering, said restricted pipes having needle valves by which the restriction may be controlled.

4. In combination with a motor vehicle, a pair of headlights on the sides of said motor vehicle and pivotally supported to swing right or left in the horizontal, a cylinder with a piston connected by linkage with each of said headlights to pivot said headlights, springs in said cylinders for normally urging said headlights to be directed straight forwards, a pilot cylinder for each of said cylinders, pistons in said pilot cylinders, several restricted pipe lines from different parts of said pilot cylinders connecting with said cylinders, an air supply to the pilot cylinders, said pistons within the pilot cylinders controlling the passage of air to said restricted pipe lines, a slidable bar resiliently connected with each of the pistons in the pilot cylinders, and means connected with the steering column of said vehicle for moving said bar in one direction or the other depending upon the direction of steering, springs being interposed between the slidable bar and the pistons of the pilot cylinders for constituting said resilient connection between these parts.

5. In combination with a motor vehicle, a pair of headlights on the sides of said motor vehicle and pivotally supported to swing right or left in the horizontal, a cylinder with a piston connected by linkage with each of said headlights to pivot said headlights, springs in said cylinders for normally urging said headlights to be directed straight forwards, a pilot cylinder for each of said cylinders, pistons in said pilot cylinders, several restricted pipe lines from different parts of said pilot cylinders connecting with said cylinders, an air supply to the pilot cylinders, said pistons within the pilot cylinders controlling the passage of air to said restricted pipe lines, a slidable bar resiliently connected with each of the pistons in the pilot cylinders, and means connected with the steering column of said vehicle for moving said bar in one direction or the other depending upon the direction of steering, comprising a gear on the steering column meshing with a rack on said slidable bar.

6. In combination with a motor vehicle, a pair of headlights on the sides of said motor vehicle and pivotally supported to swing right or left in the horizontal, a cylinder with a piston connected by linkage with each of said headlights to pivot said headlights, springs in said cylinders for normally urging said headlights to be directed straight forwards, a pilot cylinder for each of said cylinders, pistons in said pilot cylinders, several restricted pipe lines from different parts of said pilot cylinders connecting with said cylinders, an air supply to the pilot cylinders, said pistons within the pilot cylinders controlling the passage of air to said restricted pipe lines, a slidable bar resiliently connected with each of the pistons in the pilot cylinders, means connected with the steering column of said vehicle for moving said bar in one direction or the other depending upon the direction of steering, comprising a gear on the steering column meshing with a rack on said slidable bar, and means for disconnecting said gear from the rack.

7. In combination with a motor vehicle, a pair of headlights on the sides of said motor vehicle and pivotally supported to swing right or left in the horizontal, a cylinder with a piston connected by linkage with each of said headlights to pivot said headlights, springs in said cylinders for normally urging said headlights to be directed straight forwards, a pilot cylinder for each of said cylinders, pistons in said pilot cylinders, several restricted pipe lines from different parts of said pilot cylinders connecting with said cylinders, an air supply to the pilot cylinders, said pistons within the pilot cylinders controlling the passage of air to said restricted pipe lines, a slidable bar resiliently connected with each of the pistons in the pilot cylinders, means connected with the steering column of said vehicle for moving said bar in one direction or the other depending upon the direction of steering, comprising a gear on the steering column meshing with a rack on said slidable bar, and means for disconnecting said gear from the rack, comprising a rod connected with a handle by which it may be moved, and said rod being connected with said gear which is slidable on said steering column.

8. In combination with a motor vehicle, a pair of headlights on the sides of said motor vehicle and pivotally supported to swing right or left in the horizontal, a cylinder with a piston connected by linkage with each of said headlights to pivot said headlights, springs in said cylinders for normally urging said headlights to be directed straight forwards, a pilot cylinder for each of said cylinders, pistons in said pilot cylinders, several restricted pipe lines from different parts of said pilot cylinders connecting with said cylinders, an air supply to the pilot cylinders, said pistons within the pilot cylinders controlling the passage of air to said restricted pipe lines, a slidable bar resiliently connected with each of the pistons in the pilot cylinders, means connected with the steering column of said vehicle for moving said bar in one direction or the other depending upon the direction of steering, comprising a gear on the steering column meshing with a rack on said slidable bar, means for disconnecting said gear from the rack, comprising a rod connected with a handle by which it may be moved, said rod being connected with said gear which is slidable on said steering column, and means for returning said slidable bar to its neutral position.

9. In combination with a motor vehicle, a pair of headlights on the sides of said motor vehicle and pivotally supported to swing right or left in the horizontal, a cylinder with a piston connected by linkage with each of said headlights to pivot said headlights, springs in said cylinders for normally urging said headlights to be directed straight forwards, a pilot cylinder for each of said cylinders, pistons in said pilot cylinders, several restricted pipe lines from different parts of said pilot cylinders connecting with said cylinders, an air supply to the pilot cylinders, said pistons within the pilot cylinders controlling the passage of air to said restricted pipe lines, a slidable bar resiliently connected with each of the pistons in the pilot cylinders, means connected with the steering column of said vehicle for moving said bar in one direction or the other depending upon the direction of steering, comprising a gear on the steering column meshing with a rack on said slidable bar, means for disconnecting said gear from the rack, comprising a rod connected with a handle by which it may be moved, said rod being connected with said gear which is slidable on said steering column, and means for returning said slidable bar to its neutral position, comprising a bar pivotally supported at one end and pivotally connected at the other end with said slidable bar and disposed at right angles thereto, and balanced springs acting against the sides of said pivoted bar to urge it into a neutral position.

FRED HAMM.